（12）United States Patent
Girolamo

(10) Patent No.: US 11,280,314 B2
(45) Date of Patent: Mar. 22, 2022

(54) PULTRUDED FIBROUS COMPOSITE STRIP WITH WIDTH AND THICKNESS TAPERED ENDS FOR WIND TURBINE SPAR CAPS

(71) Applicant: Siemens Gamesa Renewable Energy A/S, Brande (DK)

(72) Inventor: Donato Girolamo, Molinara (IT)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/367,302

(22) Filed: Mar. 28, 2019

(65) Prior Publication Data

US 2019/0309727 A1 Oct. 10, 2019

(30) Foreign Application Priority Data

Apr. 5, 2018 (EP) ..................................... 18165844

(51) Int. Cl.
*F03D 1/06* (2006.01)
*B29C 70/52* (2006.01)
(Continued)

(52) U.S. Cl.
CPC ............ *F03D 1/0675* (2013.01); *B29C 70/30* (2013.01); *B29C 70/52* (2013.01);
(Continued)

(58) Field of Classification Search
CPC ......... B29C 70/20; B29C 70/30; B29C 70/52; B29C 99/0028; B29L 2031/085;
(Continued)

(56) References Cited

U.S. PATENT DOCUMENTS 7,976,282 B2 * 7/2011 Livingston ............ F03D 1/0675
 416/226
10,232,528 B2 * 3/2019 Boon .................... B29C 70/545
(Continued)

FOREIGN PATENT DOCUMENTS

EP 3026259 A1 6/2016
GB 2520079 A 5/2015
WO WO-2015192867 A1 * 12/2015 ......... B29D 99/0025

OTHER PUBLICATIONS

European Search Report dated Oct. 9, 2018 for Application No. 18165844.4.

*Primary Examiner* — Christopher R Legendre
(74) *Attorney, Agent, or Firm* — Schmeiser, Olsen & Watts LLP

(57) ABSTRACT

A pultruded fibrous composite strip for wind turbine spar caps, a spar cap having such a strip, and a wind turbine blade having such spar cap. The strip has longitudinally extending unidirectional fibers and an elongate body having first and second edge regions separated in the longitudinal direction of the strip by an intermediate region. The intermediate region has first and second mutually opposed longitudinally extending and parallelly disposed planar surfaces. The strip's thickness is measurable perpendicular to the planar surfaces and the width is measurable parallel to the planar surfaces and perpendicular to the longitudinal direction of the strip. In the strip, the first and/or the second edge regions, starting from the intermediate region and extending longitudinally, simultaneously tapers along the width and the thickness of the strip.

9 Claims, 6 Drawing Sheets

(51) Int. Cl.
  *B29D 99/00* (2010.01)
  *B29L 31/08* (2006.01)
  *B29C 70/20* (2006.01)
  *B29C 70/30* (2006.01)

(52) U.S. Cl.
  CPC .......... *B29D 99/0028* (2013.01); *B29C 70/20* (2013.01); *B29L 2031/085* (2013.01); *F05B 2230/20* (2013.01); *F05B 2240/301* (2013.01); *F05B 2280/6003* (2013.01)

(58) Field of Classification Search
  CPC .............. F03D 1/0675; F05B 2240/301; F05B 2240/302; F05B 2230/20; F05B 2280/6003
  See application file for complete search history.

(56) References Cited

U.S. PATENT DOCUMENTS

| | | |
|---|---|---|
| 2014/0003956 A1 | 1/2014 | Lull et al. |
| 2017/0121877 A1 | 5/2017 | Ramachandran et al. |
| 2017/0342959 A1* | 11/2017 | Hayden .................. B29C 70/00 |
| 2019/0309727 A1* | 10/2019 | Girolamo ................ B29C 70/52 |

* cited by examiner

PULTRUDED FIBROUS COMPOSITE STRIP WITH WIDTH AND THICKNESS TAPERED ENDS FOR WIND TURBINE SPAR CAPS

CROSS-REFERENCE TO RELATED APPLICATIONS

This application claims priority to European application No. 18165844.4, having a filing date of Apr. 5, 2018, the entire contents of which are hereby incorporated by reference.

FIELD OF TECHNOLOGY

The following relates generally to wind turbines, and in particular, to a spar cap of a wind turbine rotor blade. More specifically, the following relates to pultruded unidirectional fibrous composite strips, spar caps having such pultruded unidirectional fibrous composite strips, and wind turbine blades having spar caps that have such pultruded unidirectional fibrous composite strips.

BACKGROUND

Dimensions of wind turbines and wind blades are ever increasing, and consequently are increasing the challenges to overcome during the manufacturing processes of such wind turbine rotor blades. Presently, preferred materials used to manufacture wind turbine rotor blades, hereinafter also referred to as the blades, are glass- and/or carbon-fiber reinforced plastics (CFRP) commonly referred to as "composites". Recent developments in the wind turbine industry have led to the introduction of pultruded unidirectional fibrous composite strips, i.e. pultruded strips of composite material having unidirectional fibers (UD) reinforcement, mostly in the spar cap constructions, which represent the main load carrying components of the rotor blades.

FIG. 4 schematically shows a scheme of arrangement of such pultruded strips 201 in a spar cap (not shown in FIG. 4) of a part of an airfoil 20 of a wind turbine rotor blade. The airfoil 20 of the blade has a leading edge 14a and a trailing edge 13a. Generally, in the blade two or four spar caps are present, each two forming a pair separated in a flapwise direction of the blade by a web, and each running in spanwise direction 16d of the blade, although in FIG. 4 for sake of simplicity only part of one such spar cap is schematically represented.

The conventionally known pultruded strip 201, hereinafter also referred to as the conventional strip 201 or profile 201 is defined by planar surfaces and generally resembles a longitudinally, i.e. along a longitudinal axis 9c of the conventional strip 201, elongated rectangular parallelepiped such as a bar or slab, and has a rectangular shaped cross-section when sectioned normally to the longitudinal axis 9c. Fibers 99 in the conventional strip 201, for example carbon fibers run along the longitudinal axis 9c of the strip 201. The length of such strip 201 is measured along its longitudinal axis 9c i.e. along the alignment of the fibers 99, the width is measured perpendicular to the length measurement and along the top or bottom planar surfaces of the strip 201, and the thickness is measured mutually perpendicular to the longitudinal axis 9c and to the width. Typical width and thicknesses of such strips 201 in spar caps vary respectively between 50 to 200 mm and 2 to 5 mm. Such conventional strips 201 of FIG. 4 are stacked atop each other to form a stack of the conventional strips 201, although only two such strips 201 are shown in FIG. 4, the number of strips 201 may differ and usually is greater than two.

The stack is resin infused to form the conventional spar cap which is then subsequently used as pre-formed structure in the blade shell formation where fiber mats are laid-up over and around the pre-fabricated spar cap and other parts of the blade mold to form the blade. Alternatively, the resin infusion and curing for shell formation of the blade, example VARTM (vacuum assisted resin transfer molding), is carried out for the strips 201 simultaneously along with forming the shell of the blade, by laying up fiber mats around the stack of the strips 201. The spar cap so formed is generally embedded in the shell of the blade. The strips 201 are arranged in the spar cap in such a way that the fibers 99 are aligned along the spanwise direction 16d of the blade.

One of the major downsides of using CFRP in form of conventional strip 201 arises from their longitudinal ends or abrupt terminations. Given the very large stiffness of the strip 201, even starting a 2 mm thick profile with sharp edges, such as shown in FIG. 4 introduces large stress concentrations in the shell where the edges contact the shell, and peel forces between the strips 201 that can be fatal to the structural integrity of the blade.

The aforementioned problem of abrupt terminations of the strips 201 may be addressed by tapering the thickness of the strips 201 in the longitudinal direction 9c as shown in FIG. 5. However, conventionally tapered strips 201a have other problems. First the tapering angle is constant and usually small angles are chosen, in the order of 1:100-1:50. This makes the tapering regions very large, with the disadvantages of—firstly, consumables used in the machining process less durable; secondly, larger machined surfaces, exposed to potential environmental contamination (the un-machined surface of the profiles is usually protected by peel-ply removed just right before usage, but machining results in loss of peel ply); and thirdly, material wasted during machining.

Additionally, even choosing the solution represented in FIG. 5 introduces local bending moments in the location where the strip 201a terminates. Thus, the local stress concentrations in the spar cap where the strip 201a terminates are high, generally in the strip termination region at different spanwise positions and aggravated throughout the width of the strip 201a.

SUMMARY

An aspect relates to a pultruded fibrous composite strip for wind turbine spar caps that at least partially obviates the aforementioned three main problems of durability of consumables used in the machining process, potential environmental contamination, and wastage of material during machining. Furthermore, it is also desired that the pultruded fibrous composite strip reduced stress concentration in specific spanwise positions of the blade.

In embodiments of the present technique, pultruded fibrous composite strip for a spar cap of a wind turbine rotor blade is presented, wherein the longitudinal ends or terminations are tapered similar to the conventional strip 201a of FIG. 5 but unlike the conventional tapered strip 201a, the tapering of the strip of the present technique is both in width and thickness, simultaneously.

In an aspect of the present technique a pultruded fibrous composite strip for a spar cap of a wind turbine rotor blade is presented. The pultruded fibrous composite strip, hereinafter referred to as the strip, has a longitudinal axis and extends along the longitudinal axis, in other words the strip has an elongate structure. The strip has unidirectional fibers, for example carbon fibers, extending along the longitudinal axis, i.e. in longitudinal direction, of the strip. The strip has a first edge region and a second edge region i.e. the two ends of the elongate strip. The strip further has an intermediate region that separates, along the longitudinal direction of the strip, the first and the second edge regions. The intermediate region is defined by first and second mutually opposed longitudinally extending and parallelly disposed planar surfaces. In the strip, a thickness of the strip is determinable or measurable perpendicular to the first and the second planar surfaces whereas a width of the strip is determinable or measurable parallel to the first and the second planar surfaces and perpendicular to the longitudinal direction of the strip. In the strip, at least one of the first and the second edge regions, starting from the intermediate region and extending longitudinally, simultaneously tapers along the width and the thickness of the strip. Thus, the strip does not have edges with steep gradient i.e. perpendicular edges, at its longitudinal ends as are present in conventionally known strips, and thus is devoid of the aforementioned problems presented by the conventionally known strips. The edge regions extend from the intermediate region and provide a gradual transition through tapering both in width and thickness.

In an embodiment of the strip, the at least one of the first and the second edge regions that simultaneously tapers along the width and the thickness of the strip includes first and second right-angled polygonal faces, for example rectangular faces or quadrilateral faces. The polygonal faces are disposed perpendicularly to the first and the second planar surfaces. A side of the first polygonal face, starting from the intermediate region, tapers in thickness at a rate between 1:100 and 1:20, for example, between 1:100 and 1:50; and a side of the second polygonal face, starting from the intermediate region, tapers in thickness at a rate between 1:100 and 1:20. In a related embodiment, the taper of the side of the first polygonal face is less than the taper of the side of the second polygonal face. The different taperings result into ending of the first and the second polygonal faces at different longitudinal distances of the strip and thus in a tapering of the width.

In another embodiment of the strip, the first and the second polygonal faces are parallel to each other. Thus, tapering in width of the edge region starts later as compared to the tapering in thickness with reference to the intermediate region from which the edge region emanates. Thus, providing a design flexibility which may be adapted according to the desired use of the strip for example position of the strip in the stack of strips forming the spar cap of the blade.

In another aspect of the present technique, a spar cap for a wind turbine rotor blade is presented. The spar cap comprises at least one pultruded fibrous composite strip, i.e. the strip, according to any of the embodiments of the aforementioned aspect.

In another aspect of the present technique, a wind turbine rotor blade is presented. The wind turbine rotor blade includes at least one spar cap. The spar cap comprises at least one pultruded fibrous composite strip, i.e. the strip, according to any of the embodiments of the aforementioned aspects. The first and the second edge regions, as mentioned in the aforementioned aspects, are separated in a spanwise direction of the blade.

The aforementioned strip of the present technique has several advantages. First, since tapering of the longitudinal end or termination or edge region is both in width and thickness, the edge of the tapering is not a straight line of length same as width of the strip as was in conventional strip 201a of FIG. 5, but a slanted line whose length is greater than the width of the strip in the intermediate region, and thus stress at termination, and particularly at the edge of these terminations or edge regions is distributed along a greater area in the present strip as compared to the conventional strip 201a of FIG. 5, thus at least partially obviating the stress concentration happening in the conventional strip 201a of FIG. 5. Furthermore, since the tapering is also in width one side of the tapered end terminates before the other side of the same tapered end, for example one side tapers at 1:100 to 1:20 whereas the other side tapers at 1:100 to 1:20 and this terminates before the former side and thus volume of the tapered region is less spread as compared to the conventionally known tapered region as shown in FIG. 5 in which both side taper at same rate within the conventionally known range of 1:100 to 1:50. Thus, lesser machining is required, which saves time and positively impacts durability of consumables used in the machining process. Furthermore, since lesser area has been machines the loss of peel-ply is lesser which in turn decreases potential environmental contamination.

BRIEF DESCRIPTION

Some of the embodiments will be described in detail, with references to the following Figures, wherein like designations denote like members, wherein:

FIG. 1 schematically depicts a wind turbine having a wind turbine rotor blade in which a spar cap having a pultruded fibrous composite strip of the present technique may be incorporated;

FIG. 2 schematically depicts the wind turbine rotor blade in which a spar cap having a pultruded fibrous composite strip of the present technique may be incorporated;

FIG. 3 schematically shows an orientation of the spar cap having the strip of the present technique with respect to an airfoil of the blade of FIG. 2;

Figure 6:
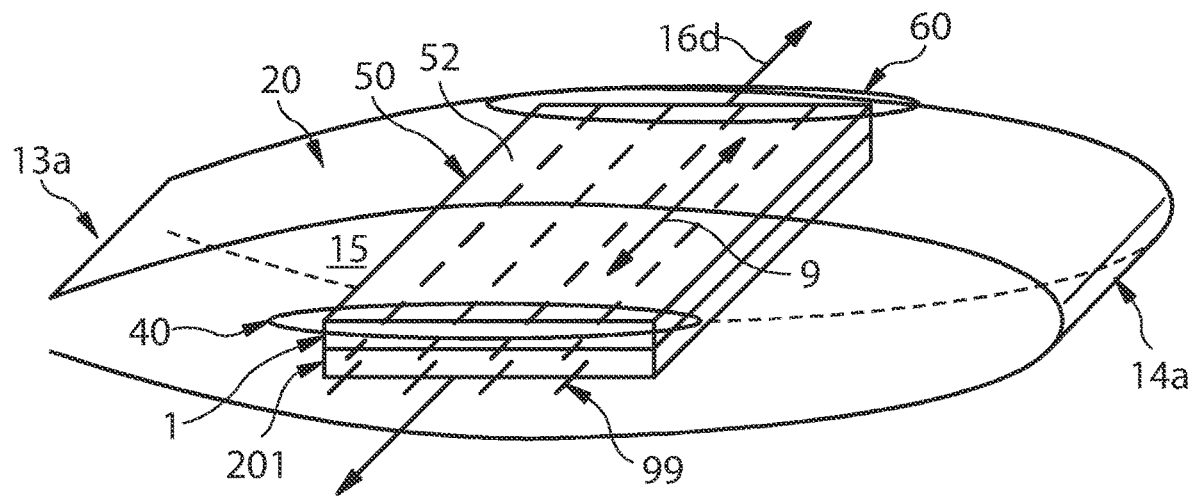
Figure 7:
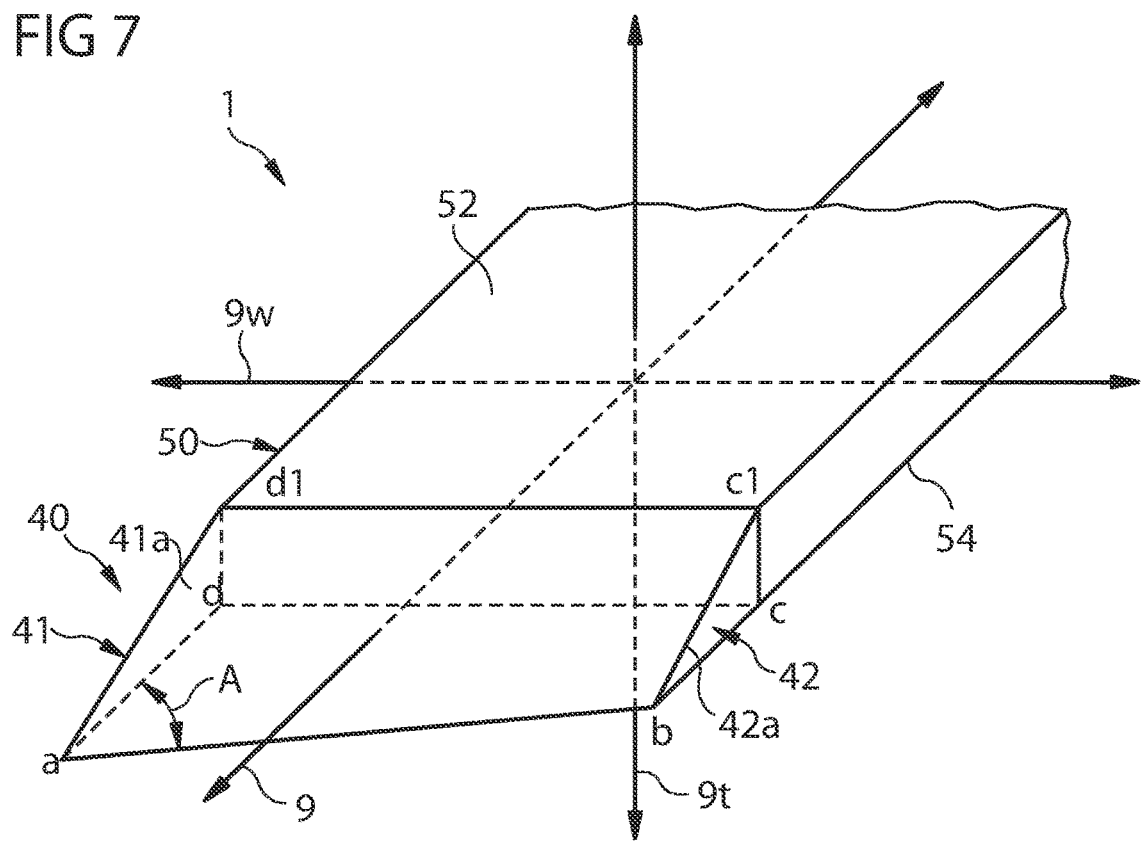
Figure 8:
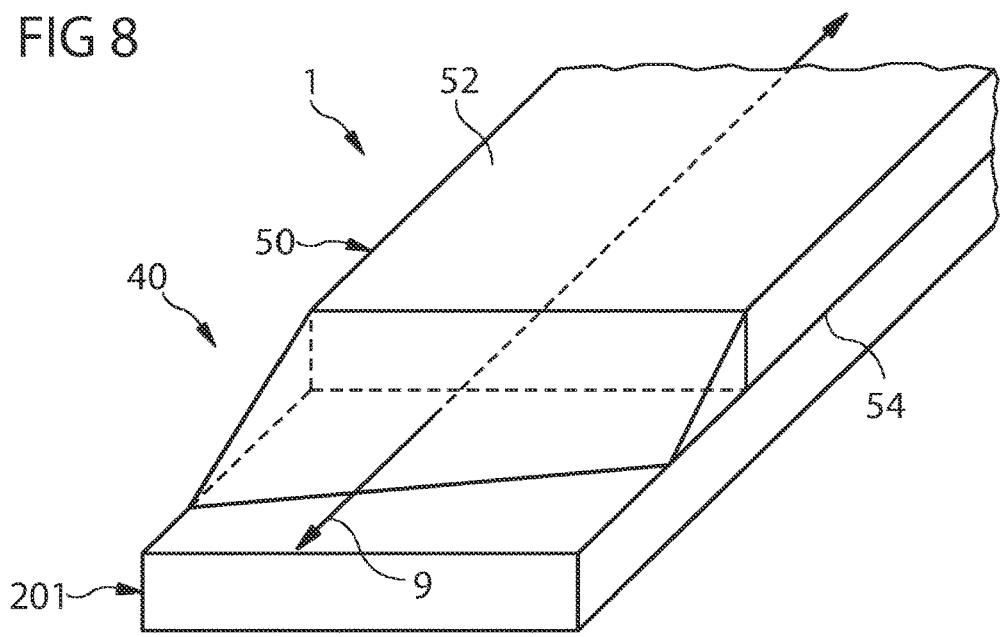
Figure 9:
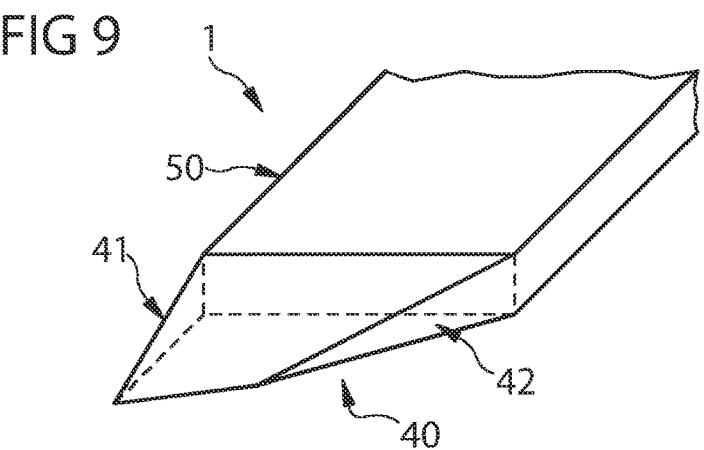
Figure 10:
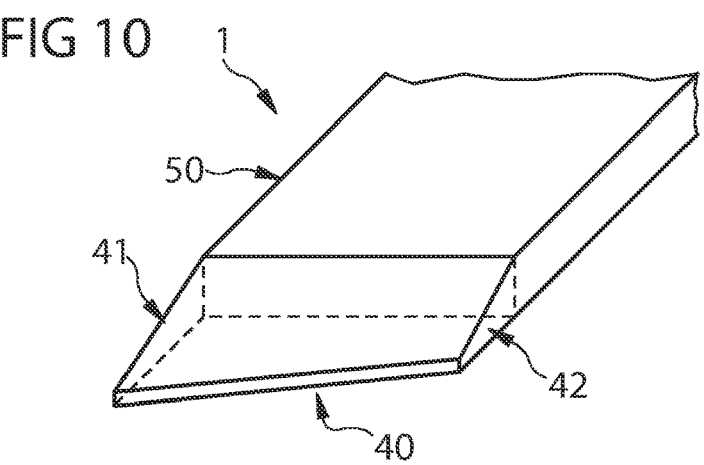

FIG. 6 schematically depicts location of tapered ends in the pultruded fibrous composite strip of the present technique arranged on top of a conventional strip and the orientation of the tapered ends with respect to the blade of the wind turbine;

FIG. 7 schematically depicts a tapered end in an exemplary embodiment of the pultruded fibrous composite strip of FIG. 6 according to aspects of the present technique;

FIG. 8 schematically depicts the strip of FIG. 7 arranged on top of a conventional strip;

FIG. 9 schematically depicts another exemplary embodiment of the pultruded fibrous composite strip of the present technique; and FIG. 10 schematically depicts yet another exemplary embodiment of the pultruded fibrous composite strip of the present technique.

DETAILED DESCRIPTION

Hereinafter, above-mentioned and other features of the present technique are described in detail. Various embodiments are described with reference to the figures, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit embodiments of the invention. It may be evident that such embodiments may be practiced without these specific details.

It may be noted that in the present disclosure, the terms "first", "second", "third" etc. are used herein only to facilitate discussion and carry no particular temporal or chronological significance unless otherwise indicated.

Figure 1:
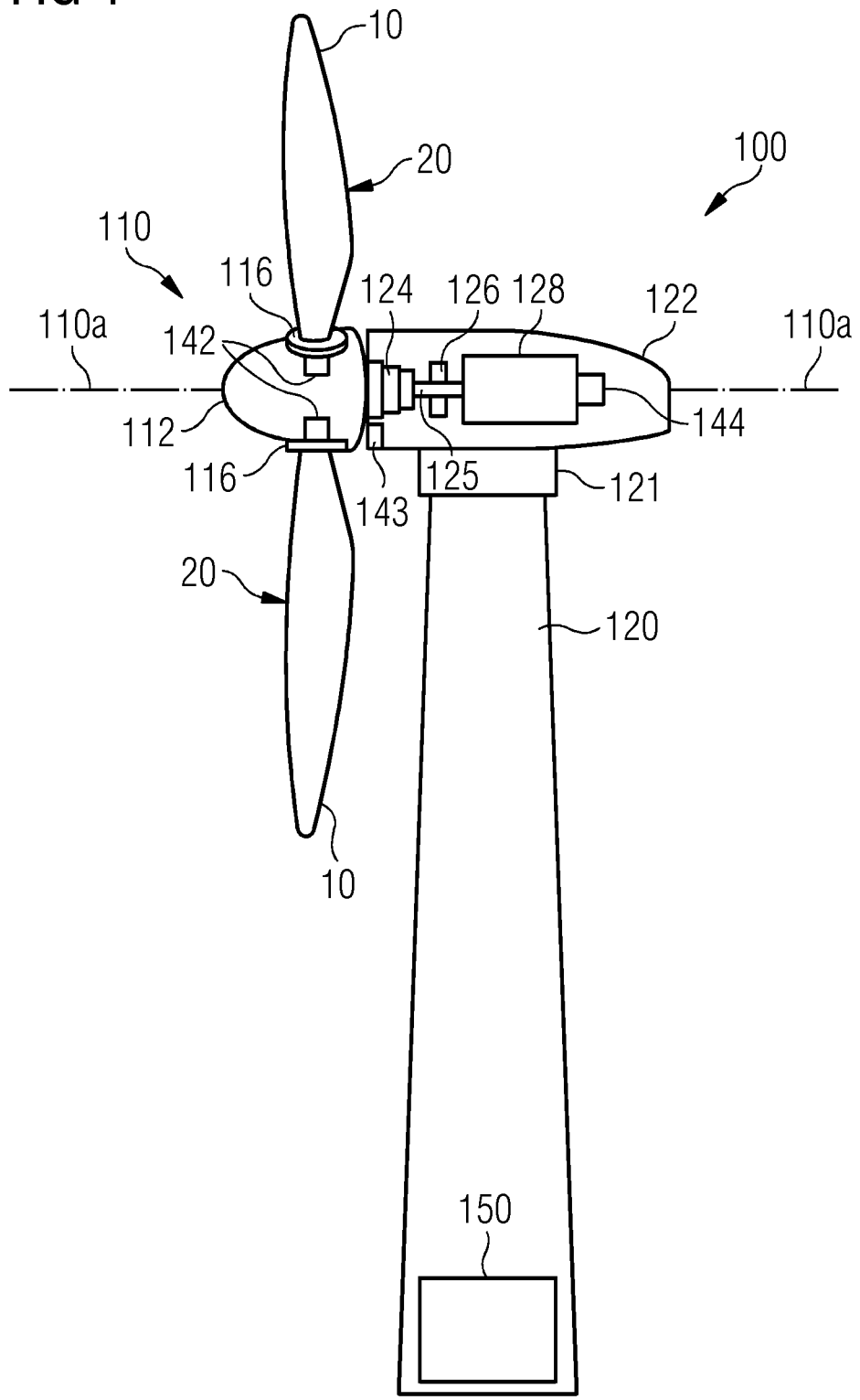

FIG. 1 shows an exemplary embodiment of a wind turbine 100 of the present technique. The wind turbine 100 includes a tower 120, which is mounted on a fundament (not shown). A nacelle 122 is mounted on top of the tower 120 and rotatable with regard to the tower 120 by means of a yaw angle adjustment mechanism 121 such as yaw bearings and yaw motors. The yaw angle adjustment mechanism 121 functions to rotate the nacelle 122 around a vertical axis (not shown) referred to as a yaw axis, which is aligned with the longitudinal extension of the tower 120. The yaw angle adjustment mechanism 121 rotates the nacelle 122 during operation of the wind turbine 100 to ensure that the nacelle 122 is appropriately aligned with the current wind direction to which the wind turbine 100 is subjected.

Figure 2:
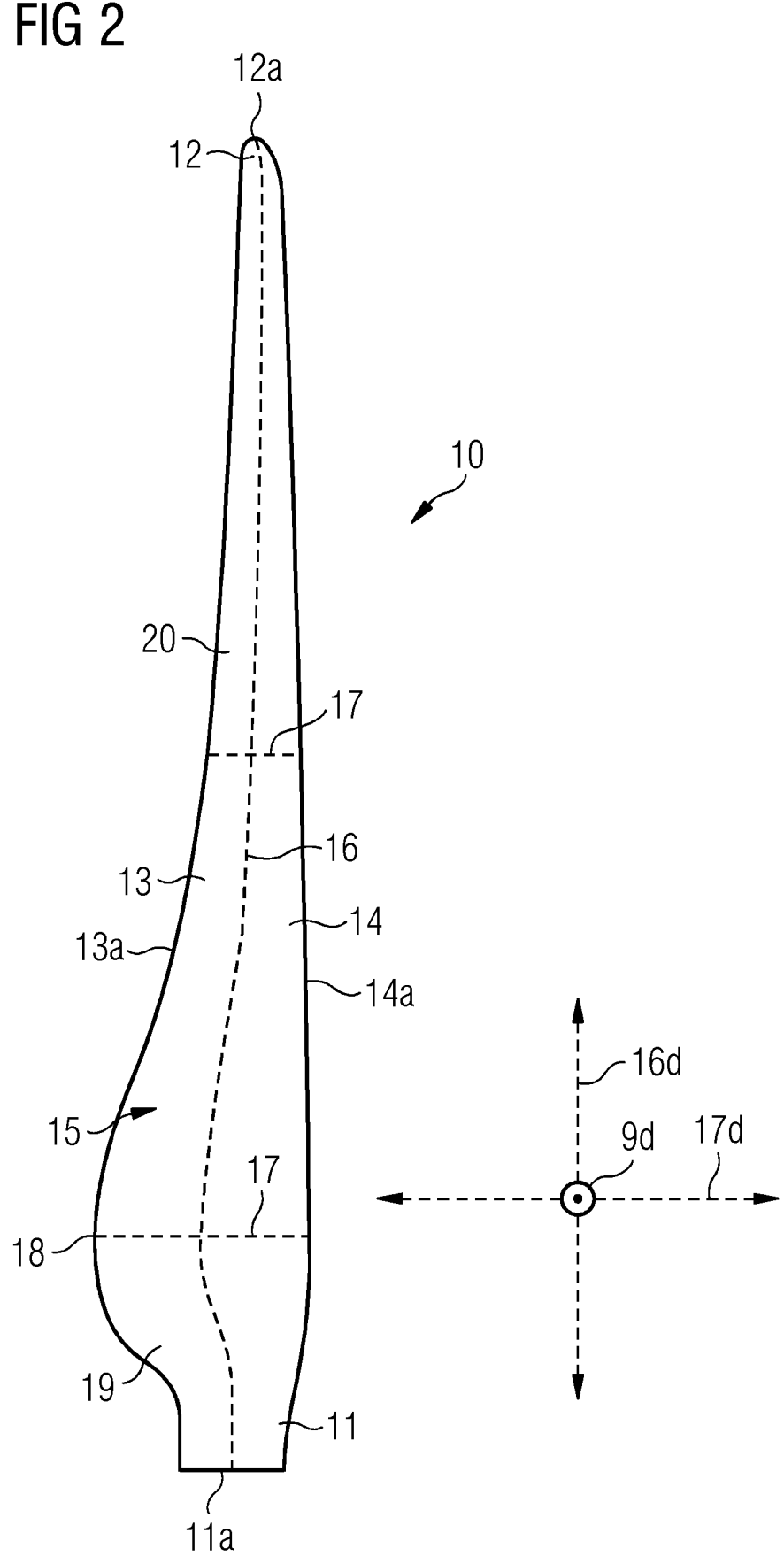

The wind turbine 100 further includes a rotor 110 having at least a rotor blade 10, and generally three rotor blades 10, although in the perspective view of FIG. 1 only two rotor blades 10 are visible. One of the rotor blades 10 is schematically depicted in FIG. 2. The rotor 110 is rotatable around a rotational axis 110a. The rotor blades 10, hereinafter also referred to as the blades 10 or as the blade 10 when referring to one of the blades 10, are generally mounted at a driving collar 112, also referred to as a hub 112. The hub 112 is mounted rotatable with regard to the nacelle 122 by means of a main bearing (not shown). The hub 112 is rotatable about the rotational axis 110a. Each of the blades 10 extends radially with respect to the rotational axis 110a and has an airfoil section 20.

In between the hub 112 and each of the rotor blades 10, is provided a blade adjustment mechanism 116 to adjust the blade pitch angle of the blade 10 by rotating the respective blade 10 about a longitudinal axis (not shown) of the blade 10. The longitudinal axis of each of the blade 10 is aligned substantially parallel with the longitudinal extension of the respective blade 10. The blade adjustment mechanism 116 functions to adjust blade pitch angles of the respective blade 10.

The wind turbine 100 includes a main shaft 125 that rotatably couples the rotor 110, particularly the hub 112, to a generator 128 housed within the nacelle 122. The hub 112 is connected to a rotor of the generator 128. In an exemplary embodiment (not shown) of the wind turbine 100, the hub 112 is connected directly to the rotor of the generator 128, thus the wind turbine 100 is referred to as a gearless, direct drive wind turbine 100. As an alternative, as shown in the exemplary embodiment of FIG. 1, the wind turbine 100 includes a gear box 124 provided within the nacelle 122 and the main shaft 125 connects the hub 112 to the generator 128 via the gear box 124, thereby the wind turbine 100 is referred to as a geared wind turbine 100. Furthermore, a brake 126 is provided to stop the operation of the wind turbine 100 or to reduce the rotational speed of the rotor 110 for instance in case of a very strong wind and/or in case of an emergency.

The wind turbine 100 further includes a control system 150 for operating the wind turbine 100 at desired operational parameters. The wind turbine 100 may further include different sensors for example a rotational speed sensor 143, a power sensor 144, angle sensors 142, etc. that provide inputs to the control mechanism 150 or other components of the wind turbine 100 to optimize operation of the wind turbine 100.

Furthermore, as shown in FIG. 2, the rotor blade 10 includes a root section 11 having a root 11a and an airfoil section 20. Generally, the rotor blade 10 includes a transition section 90 in between the root section and the airfoil section 20. The airfoil section 20, hereinafter also referred to as the airfoil 20, includes a tip section 12 having a tip 12a. The root 11a and the tip 12a are separated by a span 16, of the rotor blade 10, which follows the shape of the rotor blade 10. A direction along or parallel to the span 16 is referred to as span-wise direction 16d. The tip section 12, including the tip 12a therein, extends from the tip 121 towards the root 11a up to a span-wise position of approx. 33.3% (percent), i.e. one third of the total length of the blade 10, as measured from the tip 12a. The tip 12a extends within the tip section 12 towards the root 11a up to a spanwise position of approx. one meter. The rotor blade 10 includes a leading-edge section 14 having a leading edge 14a, and a trailing edge section 13 having a trailing edge 13a. The trailing edge section 13 surrounds the trailing edge 13a. Similarly, the leading-edge section 14 surrounds the leading edge 14a. A protective shell (not shown in FIG. 2) may be mounted on the blade 10, especially around the leading edge 14a.

At each span-wise position perpendicular to the span 16, a chord line 17 that connects the leading edge 14a and the trailing edge 13a can be defined. A direction along or parallel to the chord line 17 is referred to as chord-wise direction 17d. FIG. 2 depicts two such chord lines 17 at two different span-wise positions. Furthermore, a direction mutually perpendicular to the span-wise direction 16d and to the chord-wise direction 17d is referred to as a flap-wise direction 9d. The rotor blade 10 has a shoulder 18 that is a section of the rotor blade 10 where the chord line 17 has maximum chord length, i.e. in example of FIG. 2 at the chord line 17 that is depicted towards the root 11a.

Figure 3:
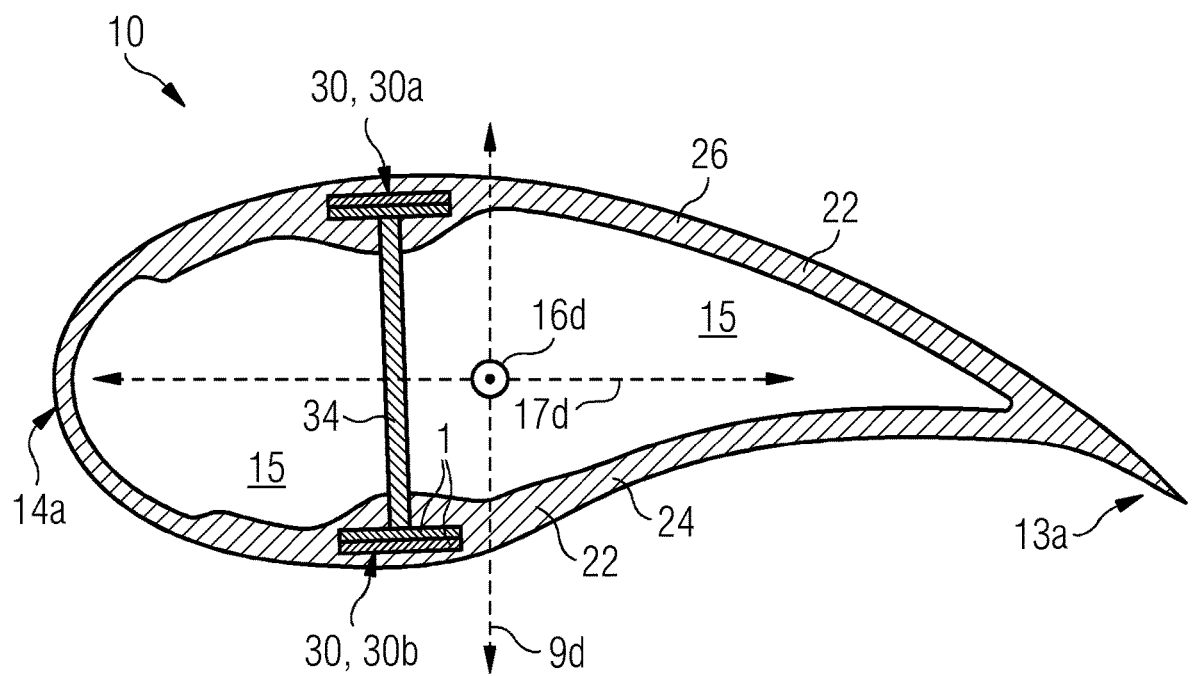
Figure 4:
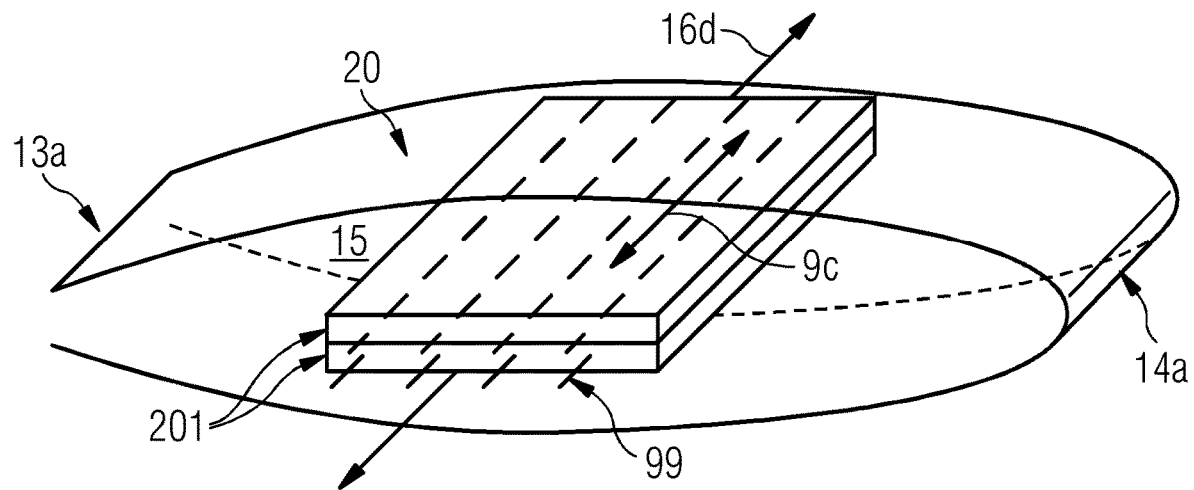
FIG. 4 represents a prior art depicting a conventionally known strip without tapering on top of a similar strip and their orientation with respect to the blade of the wind turbine.

As shown in FIG. 3 in combination with FIG. 2, in the wind turbine 100, the blade 10 includes a blade shell 22. The blade 10 of the wind turbine 100 may have a 'butterfly blade' construction (not shown) having leeward and windward shells that are separately manufactured and then joined together to form the blade 10, or may have the well-known 'integral blade' construction of Siemens as shown in FIG. 3, where unlike butterfly blade construction the leeward and windward shells are not separately manufactured. In the integral blade construction, the entire shell is manufactured in one-part as an integral shell and thus does not have a separately manufactured leeward and windward side. The blade 10 includes a plurality of spar caps 30, although FIG. 3 only shows a pair of spar caps 30, namely 30a and 30b, there may be more spar cap pairs. The spar caps 30a, 30b of the pair are separated and supported by a web 34 forming an 'I'-beam. One spar cap 30 for example the spar cap 30a is integrated in the shell 22 at one side for example the suction side 26 whereas the other spar cap 30 for example the spar cap 30b is integrated in the shell 22 at the other side for example the pressure side 24, as shown in FIG. 3.

Hereinafter FIGS. 6 and 7, in combination with FIG. 3, have been used to explain the orientation of the spar cap 30, and orientation and configuration of the constituents of the spar cap 30, i.e. the pultruded fibrous composite strip 1 of the present technique. The pultruded fibrous composite strip 1, hereinafter referred to as the strip 1, has a longitudinal axis 9, as shown in FIGS. 6 and 7. The strip 1 extends along the longitudinal axis 9, in other words the strip 1 has an elongate structure. The strip 1 has unidirectional fibers 99, for example carbon fibers, extending along the longitudinal axis 9, i.e. in longitudinal direction, of the strip 1. The strip 1 has a first edge region 40 and a second edge region 60 i.e. the two ends of the elongate strip 1 as shown in FIG. 6 which depicts the positions of the edge regions 40, 60 with respect to each other. It may be noted that the strip 1 generally extends through a considerable distance of the total span of the blade 10, and the depiction of FIG. 6 showing apparently the strip 1 extending only in part of the blade 10 is schematic and simplified for the purpose of simplicity and for ease of understanding. It may also be noted that FIG. 7, and later FIGS. 8 to 10, depict only one of the edge regions 40, 60, and have been used to explain the depicted first edge region 40, however the same features may be applied to the second edge region 60, when both the edge regions 40, 60 of the strip 1 are tapered in accordance with aspects of the present technique.

As shown in FIG. 7 in combination with FIG. 6, the strip 1 has an intermediate region 50 that separates, along the longitudinal direction i.e. along the longitudinal axis 9 of the strip 1, the first and the second edge regions 40, 60. The intermediate region 50 has a first planar surface 52 and a second planar surface 54. The planar surfaces 52, 54 are mutually opposed longitudinally extending and parallelly disposed with respect to each other. In the strip 1, a thickness of the strip 1 is determinable or measurable perpendicular to the first and the second planar surfaces 52, 54 i.e. along the axis 9t of FIG. 7, whereas a width of the strip 1 is determinable or measurable parallel to the first and the second planar surfaces 52, 54 and perpendicular to the longitudinal direction of the strip 1, i.e. along an axis 9w which is mutually perpendicular to the longitudinal axis 9 of the strip 1 and the axis 9t of the strip 1. In the strip 1, at least one of the first and the second edge regions 40, 60, in example of FIG. 7 the first edge region 40, starting from the intermediate region 50 and extending longitudinally, i.e. along the longitudinal axis 9, simultaneously tapers along the width and the thickness of the strip 1.

As shown in FIG. 7, the tapered edge region i.e. the first edge region 40 in case of example of FIG. 7 has a first planar right-angled polygonal face 41 represented by line segments marked a-d-d1-a and a second planar right-angled polygonal face 42 represented by line segments marked b-c-c1-b. It may be noted that albeit the example of FIG. 7 shows polygonal faces 41, 42 to be triangular faces, in another embodiment of the present technique the polygonal faces may be quadrilateral for example as shown in FIG. 10. As shown in FIGS. 7 and 10 the polygonal faces 41, 42 are disposed perpendicularly to the planar surfaces 52, 54. Thus, the tapered edge region i.e. the first end region 40 in FIG. 7 is a wedge shaped volume as represented by shape defined by side c-c1-d1-d-c, the polygonal faces 41, 42, a planar bottom right trapezoid surface a-b-c-d-a, and a planar upper surface a-b-c1-d1-a. A side 41a, represented by edge d1-a, of the first polygonal face 41 starting from the intermediate region 50 tapers in thickness at a rate between 1:100 and 1:50 whereas a side 42a, represented by edge c1-b, of the second polygonal face 42 starting from the intermediate region 50 tapers in thickness at a rate between 1:100 and 1:20. The taper of the side 41a of the polygonal face 41 is different from the taper of the side 42a of the polygonal face 42. The phrase 'taper' and its quantitative measure as used herein are also generally referred to as grade, slope, incline, gradient, mainfall, pitch or rise. As shown in FIG. 7, the taper of the side 41a of the first polygonal face 41 is less than the taper of the side 42a of the second polygonal face 42.

Furthermore, as shown in FIGS. 7 and 10, the polygonal faces 41, 42 are parallel to each other in one embodiment of the strip 1, whereas non-parallel to each other in another embodiment of the strip 1 as shown in FIG. 9.

As shown in FIG. 7, in an exemplary embodiment of the strip 1, an angle A of the right trapezoid surface a-b-c-d-a is equal to 45 degree or less.

Figure 5:
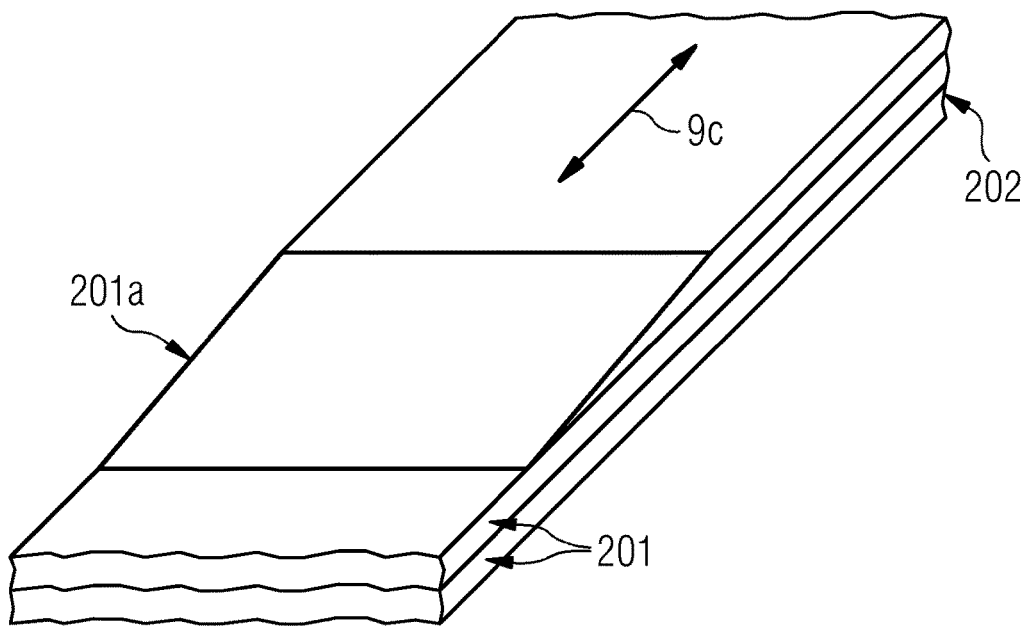
FIG. 5 represents a prior art depicting a conventionally known tapered strip arranged on top of one of the strips of FIG. 4 and their orientation with respect to the blade of the wind turbine.

FIG. 8 depicts the strip 1 positioned on top of a conventional strip 201 to form a stack of strips for the spar cap 30. However, in another embodiment (not shown), the strip 1 may be positioned on top of a conventional tapered strip 201a of FIG. 5 and in yet another embodiment (not shown), the strip 1 may be positioned on top of a similar strip 1 having same or different tapering geometries. The strip 1 of the present technique, and as depicted schematically in examples of FIGS. 6 to 10, is incorporated in one or more of the spar caps 30 of FIG. 3 which in turn is incorporated in the wind turbine rotor blade 10 of FIG. 2.

Although in the present technique, particularly in FIG. 8, the stack is shown to comprise only one tapered strip 1, in other embodiment of the present technique, the stack may include two or more such tapered strips 1. Furthermore, when having two or more tapered strips the taperings of the strip 1 i.e. the tapering along the width and thickness of one of the strips 1 may differ from the tapering along the width and thickness of one of other strips 1. It may be noted that although in the present disclosure, particularly in FIG. 6, only one stack of strip 1 has been depicted to form the spar cap 30, the spar cap 30 may comprise two or more parallelly disposed stacks of the strips 1 placed adjacent to each other and each extending longitudinally.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A pultruded fibrous composite strip for a spar cap of a wind turbine rotor blade, the strip comprising:
   unidirectional fibers extending along a longitudinal direction of the strip,
   a first edge region and a second edge region separated in the longitudinal direction of the strip by an intermediate region, wherein the intermediate region is defined by first and second mutually opposed longitudinally extending and parallelly disposed planar surfaces, wherein a thickness of the strip is determinable perpendicular to the first and second planar surfaces and a width of the strip is determinable parallel to the first and second planar surfaces and perpendicular to the longitudinal direction of the strip,
   wherein:
   at least one of the first edge region and the second edge region simultaneously tapers along the width and the thickness of the strip, starting from the intermediate region and extending longitudinally away from the intermediate region,
   wherein the at least one of the first edge region and the second edge region that simultaneously tapers along the width and the thickness of the strip comprises first and second planar right-angled polygonal faces disposed perpendicularly to the first and second planar surfaces and that taper in thickness starting from the intermediate region and extending longitudinally away from the intermediate region, and wherein the taper in thickness of the first planar right-angled polygonal face is a ratio between 1:100 and 1:50 and the taper in thickness of the second planar right-angled polygonal face is a ratio between 1:100 and 1:20, wherein the taper of the first planar right-angled polygonal face is more gradual than the taper of the second planar right-angled polygonal face.

2. The pultruded fibrous composite strip according to claim 1, wherein each of the first and the second planar right-angled polygonal faces is a quadrilateral.

3. The pultruded fibrous composite strip according to claim 1, wherein the at least one of the first edge region and the second edge region that simultaneously tapers along the width and the thickness of the strip comprises a planar bottom right trapezoid surface, and wherein an angle between two edges of the planar bottom right trapezoid surface is equal to 45 degrees or less.

4. The pultruded fibrous composite strip according to claim 1, wherein the at least one of the first edge region and the second edge region that simultaneously tapers along the width and the thickness of the strip comprises a planar upper surface.

5. The pultruded fibrous composite strip according to claim 1, wherein the unidirectional fibers are carbon fibers.

6. The pultruded fibrous composite strip according to claim 1, wherein the first and second planar right-angled polygonal faces are non-parallel to each other.

7. A spar cap for a wind turbine rotor blade, wherein the spar cap comprises at least one pultruded fibrous composite strip, wherein the at least one pultruded fibrous composite strip includes:

unidirectional fibers extending along a longitudinal direction of the strip, and a first edge region and a second edge region separated in the longitudinal direction of the strip by an intermediate region, wherein the intermediate region is defined by first and second mutually opposed longitudinally extending and parallelly disposed planar surfaces, wherein a thickness of the strip is determinable perpendicular to the first and second planar surfaces and a width of the strip is determinable parallel to the first and second planar surfaces and perpendicular to the longitudinal direction of the strip, wherein at least one of the first edge region and the second edge region includes a tapering geometry that simultaneously tapers along the width and the thickness of the strip, starting from the intermediate region and extending longitudinally away from the intermediate region, wherein the at least one of the first edge region and the second edge region that simultaneously tapers along the width and the thickness of the strip comprises first and second planar right-angled polygonal faces disposed perpendicularly to the first and second planar surfaces and that taper in thickness starting from the intermediate region and extending longitudinally away from the intermediate region, and wherein the taper in thickness of the first planar right-angled polygonal face is a ratio between 1:100 and 1:50 and the taper in thickness of the second planar right-angled polygonal face is a ratio between 1:100 and 1:20, wherein the taper of the first planar right-angled polygonal face is more gradual than the taper of the second planar right-angled polygonal face.

8. The spar cap according to claim 7, wherein the at least one pultruded fibrous strip of the spar cap comprises at least two pultruded fibrous composite strips, and wherein the at least two pultruded fibrous composite strips have respective tapering geometries that are different.

9. A wind turbine rotor blade comprising at least one spar cap, wherein each spar cap comprises at least one pultruded fibrous composite strip, wherein the at least one pultruded fibrous composite strip includes:

unidirectional fibers extending along a longitudinal direction of the strip, and a first edge region and a second edge region separated in the longitudinal direction of the strip by an intermediate region, wherein the intermediate region is defined by first and second mutually opposed longitudinally extending and parallelly disposed planar surfaces, wherein a thickness of the strip is determinable perpendicular to the first and second planar surfaces and a width of the strip is determinable parallel to the first and second planar surfaces and perpendicular to the longitudinal direction of the strip, wherein at least one of the first edge region and the second edge region simultaneously tapers along the width and the thickness of the strip, starting from the intermediate region and extending longitudinally away from the intermediate region, and wherein the at least one of the first edge region and the second edge region that simultaneously tapers along the width and the thickness of the strip comprises first and second planar right-angled polygonal faces disposed perpendicularly to the first and second planar surfaces and that taper in thickness starting from the intermediate region and extending longitudinally away from the intermediate region, and wherein the taper in thickness of the first planar right-angled polygonal face is a ratio between 1:100 and 1:50 and the taper in thickness of the second planar right-angled polygonal face is a ratio between 1:100 and 1:20, wherein the taper of the first planar right-angled polygonal face is more gradual than the taper of the second planar right-angled polygonal face;

wherein the at least one spar cap is arranged such that the respective first and second edge regions are separated along a spanwise direction of the blade.

* * * * *